United States Patent

Ryoo

[11] Patent Number: 5,966,357
[45] Date of Patent: Oct. 12, 1999

[54] DISK DISCRIMINATION METHOD FOR DIGITAL VERSATILE DISK SYSTEM

[75] Inventor: Jai-Choon Ryoo, Kyungki-do, Rep. of Korea

[73] Assignee: Samsung Electronics Co., Ltd., Kyungki-Do, Rep. of Korea

[21] Appl. No.: 08/883,706

[22] Filed: Jun. 27, 1997

[30] Foreign Application Priority Data

Jun. 29, 1996 [KR] Rep. of Korea ........................ 96-26259

[51] Int. Cl.$^6$ .................................. G11B 3/90; G11B 7/00
[52] U.S. Cl. ........................ 369/58; 369/44.25; 369/44.27
[58] Field of Search ................................ 369/54, 58, 112, 369/44.14, 44.22, 44.25, 44.27, 47, 94

[56] References Cited

U.S. PATENT DOCUMENTS 5,003,521  3/1991  Yoshida et al. ........................ 369/54 X
5,665,957  9/1997  Lee et al. ............................... 369/58 X

FOREIGN PATENT DOCUMENTS 9-320180  12/1997  Japan ............................. G11B 19/12

*Primary Examiner*—Paul W. Huber
*Attorney, Agent, or Firm*—Sughrue, Mion, Zinn, MacPeak & Seas, PLLC

[57] ABSTRACT

A disk discrimination method for a digital versatile disk (DVD) system uses a sum signal and a focus error signal as a difference signal obtained from the amount of light detected from divided optical detection areas of a divided-by-eight photodiode in a loaded disk, to discriminate whether a loaded disk is a DVD or compact disk (CD). When offsets of the sum signal and the focus error signal are normal, and are larger than predetermined reference signals, it is judged that the loaded disk is a DVD, while the loaded disk is judged to be a CD when the sum signal and the focus error signal are smaller than the reference signals. When disk type discrimination fails, an optical pickup moves a predetermined number of times to retry discrimination. Such discrimination method increases reliability of the discrimination results.

11 Claims, 8 Drawing Sheets

PRIOR ART
FIG. 2A
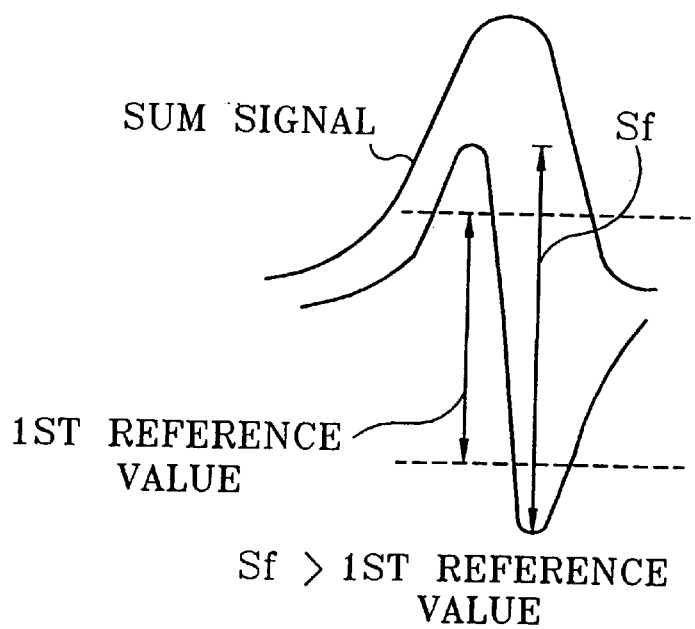
Sf > 1ST REFERENCE VALUE
PRIOR ART FIG. 2B
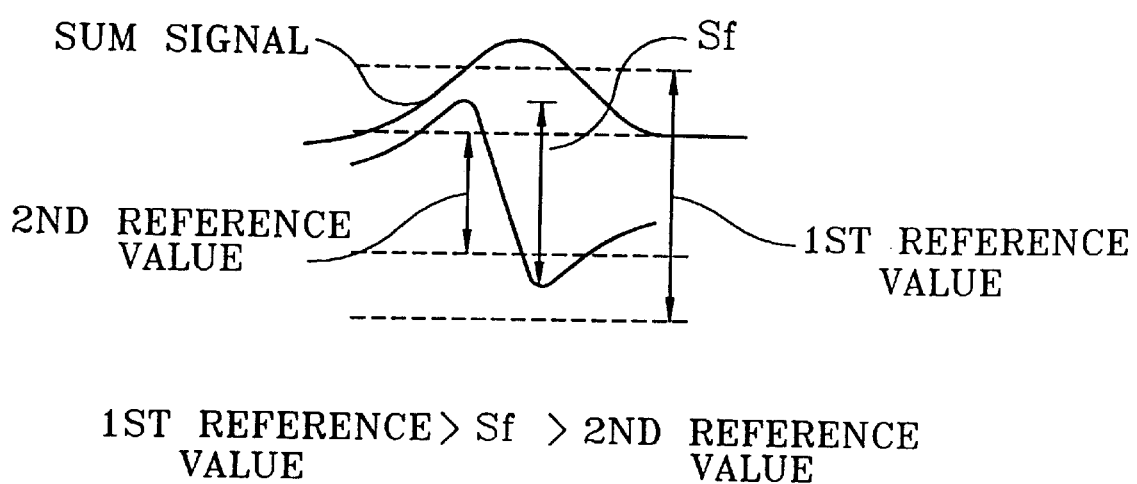
1ST REFERENCE VALUE > Sf > 2ND REFERENCE VALUE

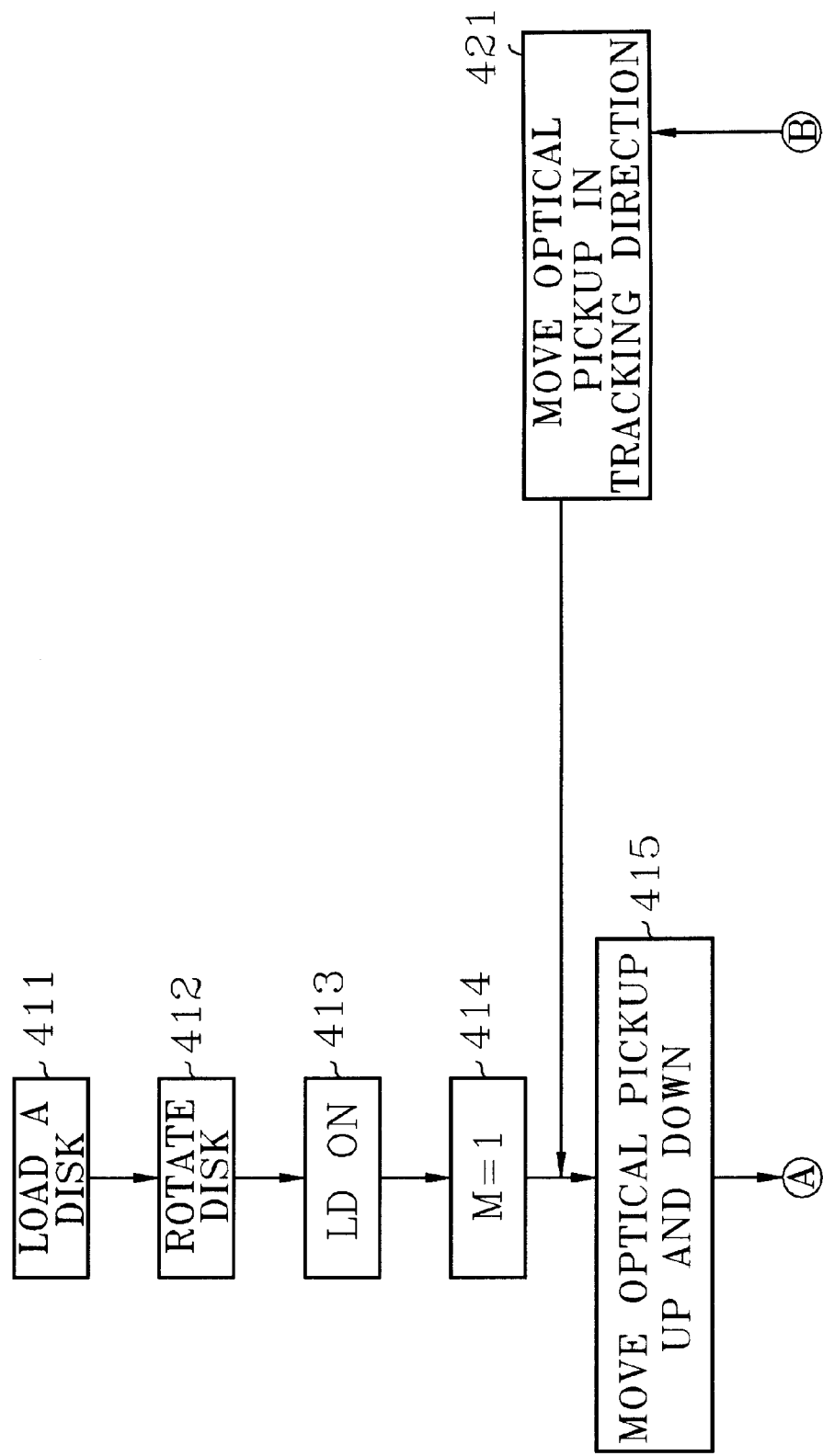

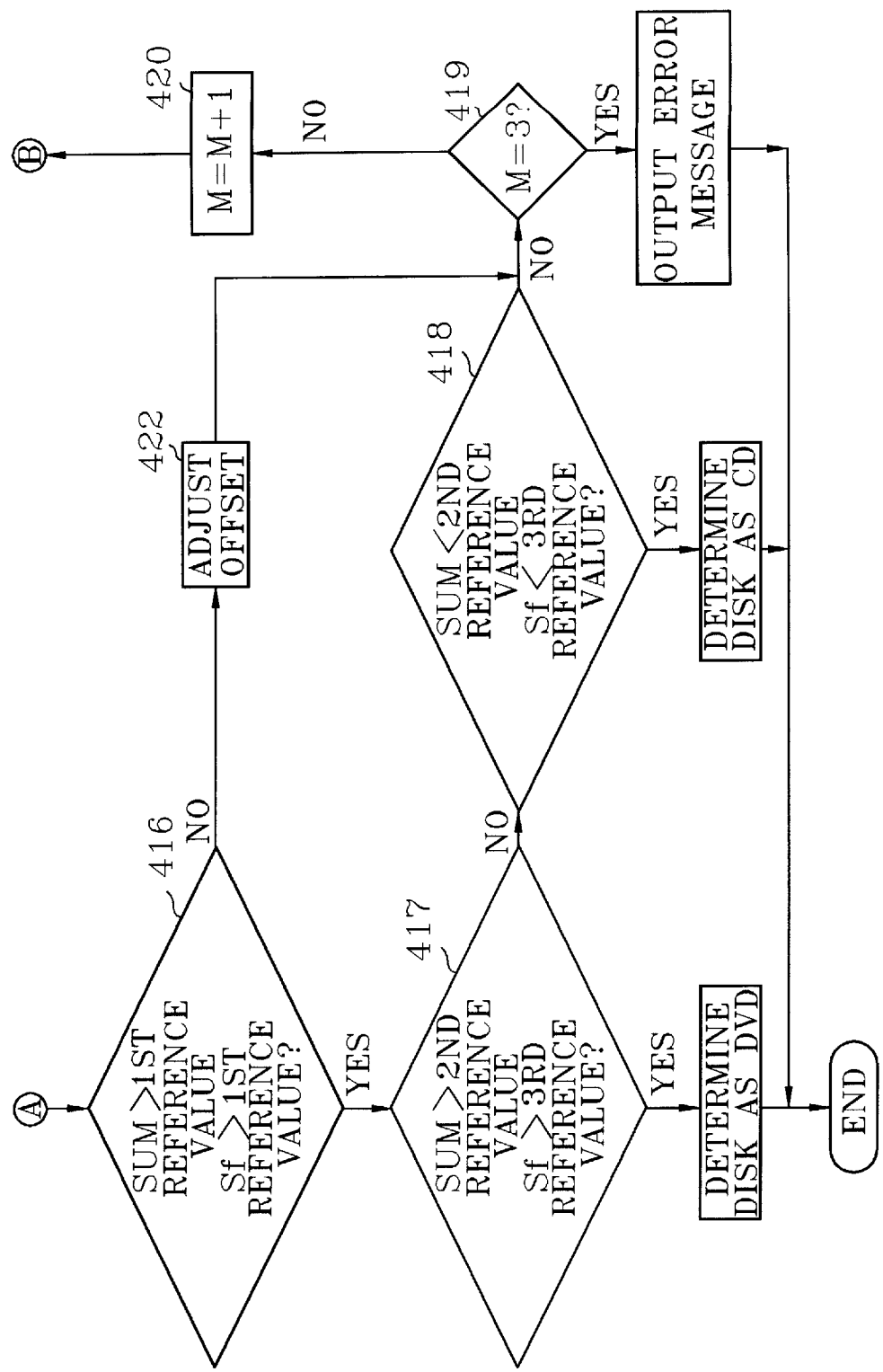

5,966,357

DISK DISCRIMINATION METHOD FOR DIGITAL VERSATILE DISK SYSTEM

BACKGROUND OF THE INVENTION

The present invention relates to a disk discrimination method for a digital versatile disk (DVD) system.

A larger amount of information can be recorded on a DVD than a compact disk (CD), and a better quality of picture can be reproduced therefrom, which may be a next-generation information media.

A DVD system for reproducing signals from a DVD mostly includes a DVD/CD combination optical pickup, so that it can reproduce signals from a CD having a relatively smaller track pitch as well as the DVD. The DVD system having a DVD/CD combination optical pickup should discriminate whether a disk is a DVD or CD before signals are reproduced from the disk. An admitted prior art technology for discriminating whether a disk is a DVD or CD is disclosed in Korean Patent Application 96-1605 filed by Samsung Electronics Co., ltd.

FIG. 1 is a flow-chart diagram showing a DVD/CD discrimination method disclosed in the above Korean Patent Application, which relates to a method which is adapted in a DVD system adopting a DVD/CD combination optical pickup which is provided with a ring-shaped shielding film. As is well known, the thickness of a CD is about 1.2 mm and that of a DVD is about 0.6 mm. When information is read from a relatively thin DVD, light in a near-axial region and a far-axial region reaches a photodiode. Meanwhile, when information is read from a relatively thick CD, only near-axial light reaches the photodiode. The amount of light detected from the DVD becomes more than that detected from the CD.

If an optical disk is loaded (step 110), the DVD system swings a focusing actuator up and down (step 120). During the time when the focusing actuator is swung up and down, if a focus error signal Sf according to the amount of light reaching a divided-by-four split photodiode is larger than a first reference value corresponding to a DVD as shown in FIG. 2A (step 130), the DVD system judges that a loaded disk is a DVD. Meanwhile, if a focus error signal Sf is smaller than the first reference signal as shown in FIG. 2B and larger than a second reference value corresponding to a CD (step 140), the DVD system judges that the loaded disk is a CD. If it is judged that the focus error signal Sf is smaller than the second reference value, an error message indicating that disk discrimination fails is output from the DVD system.

The method disclosed in the above prior art application discriminates the thickness of a disk only once using only one of a sum signal and a focus error signal of the amount of light. Accordingly, reliability of discrimination is lowered at the place where an initial position of an object lens is locally and severely damaged in the disk or a smaller signal is detected than the second reference value. Also, such a disk discrimination is not performed properly even when an offset of a detection signal fluctuates.

SUMMARY OF THE INVENTION

To solve the above problems, it is an object of the present invention to provide a disk discrimination method for a digital versatile disk (DVD) system which uses both of a sum signal and a focus error signal obtained from the amount of light detected from a divided area of a photodiode, retries discrimination by a predetermined number of times to increase reliability of discrimination when discrimination fails once, and compensates for even an offset fluctuation of a detection signal.

To accomplish the above object of the present invention, there is provided a disk discrimination method for a digital versatile disk (DVD) system to discriminate a disk loaded in the DVD system, the disk discrimination method comprising the steps of: (a) detecting light reflected from the loaded disk via a DVD/CD combination optical pickup, using an optical detector having a plurality of optical detection areas; (b) obtaining a sum signal and a focus error signal from a plurality of signals detected via the plurality of optical detection areas of the optical detector in step (a); (c) comparing the size of the sum signal obtained in step (b) with a predetermined first reference value and the size of the focus error signal obtained in step (b) with a predetermined second reference value, respectively; and (d) judging whether the loaded disk is a DVD or CD based on the comparison result obtained in step (c).

BRIEF DESCRIPTION OF THE DRAWINGS

The preferred embodiments are described with reference to the drawings wherein:

FIGS. 2A and 2B are views illustrating comparison conditions for comparing a focus error signal with a predetermined reference value in FIG. 1;

FIGS. 4A and 4B are flow-chart diagrams illustrating a DVD/CD discrimination method according to the present invention.

DETAILED DESCRIPTION OF THE PREFERRED EMBODIMENT

A preferred embodiment of the present invention will be described in detail with reference to the accompanying drawings.

Figure 1:
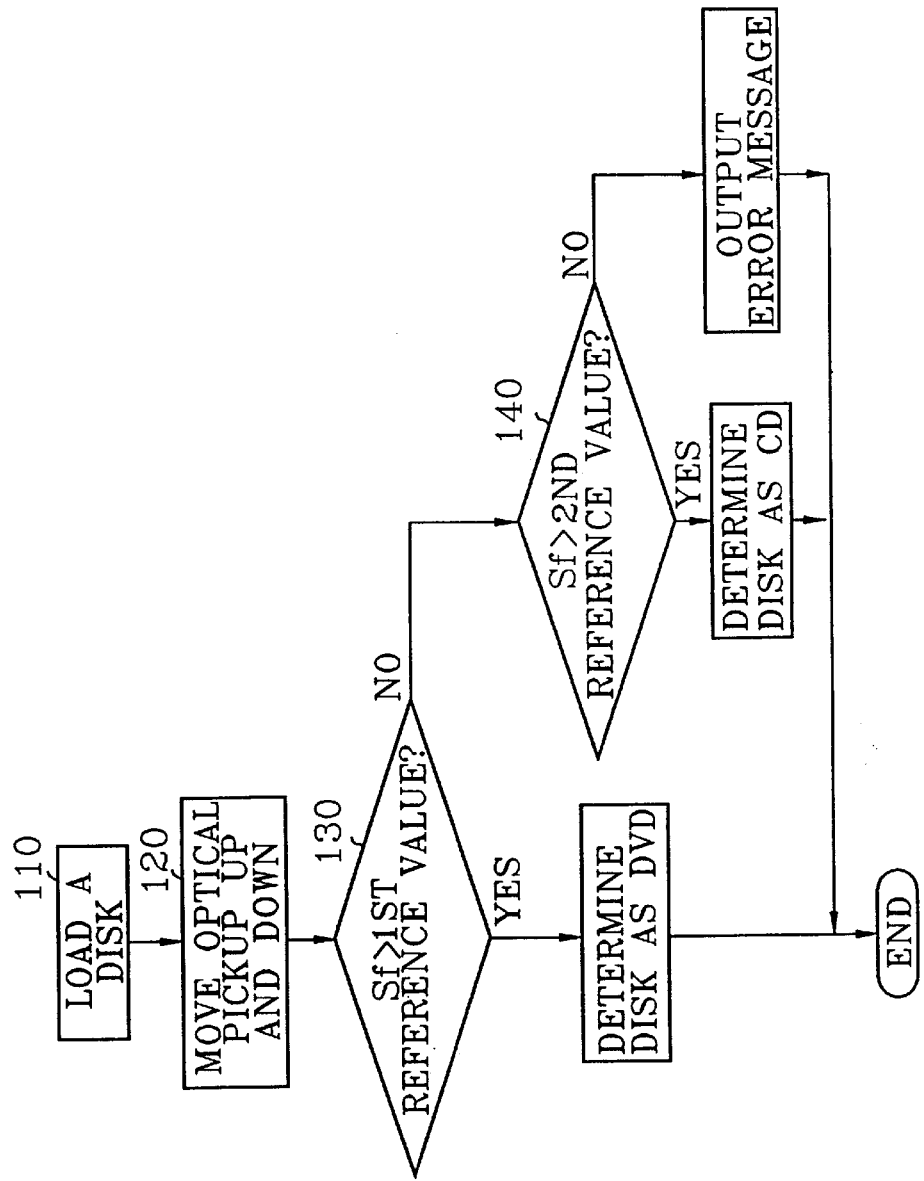
FIG. 1 is a flow-chart diagram showing an admitted prior art DVD/CD discrimination method.
Figure 3A:
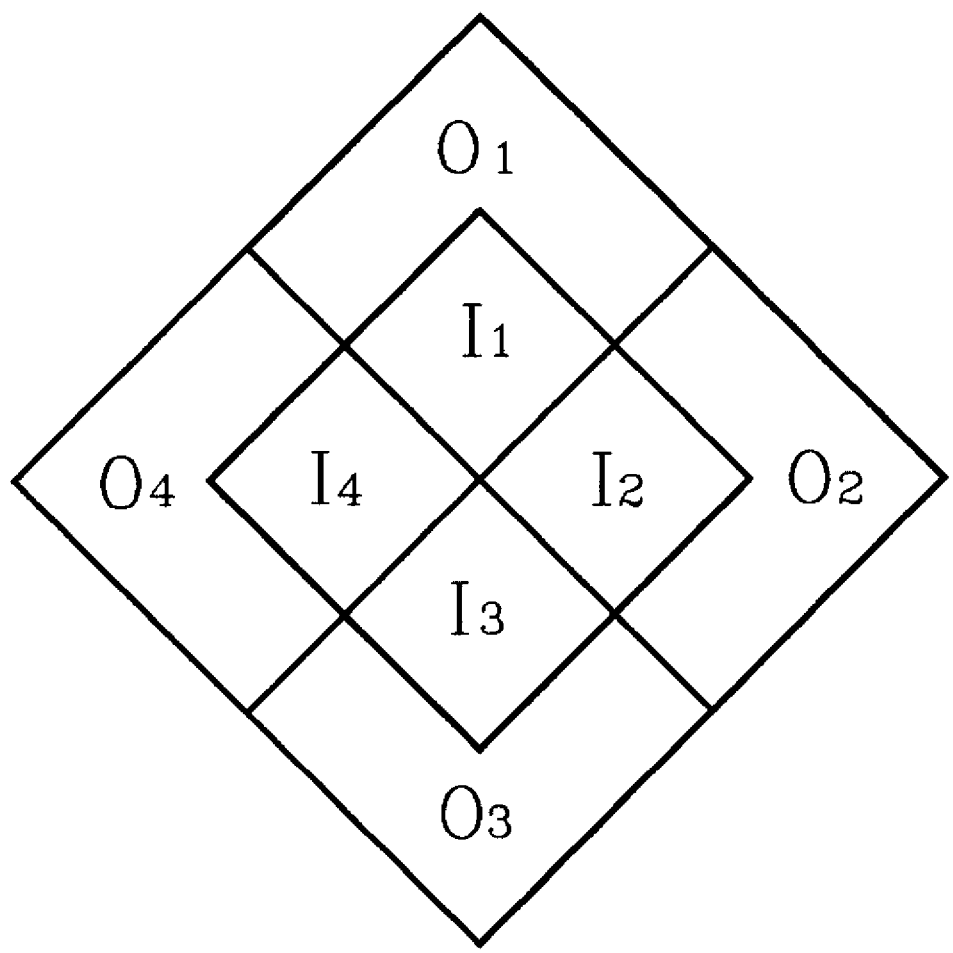
FIG. 3A shows a structure of a divided-by-eight photodiode.
Figure 3B:
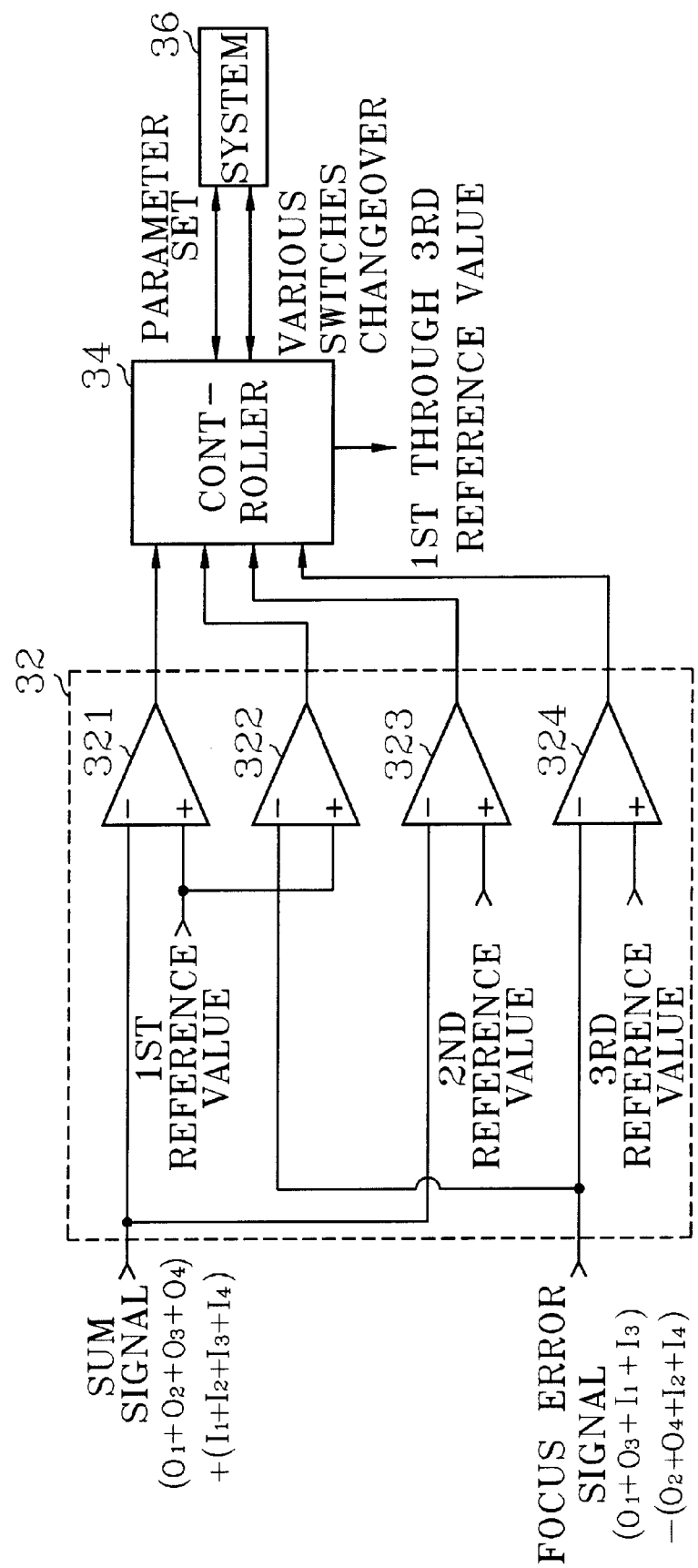
FIG. 3B is a block diagram of a part of DVD system to which a DVD/CD discrimination system is applied according to the present invention.
Figure 5A:
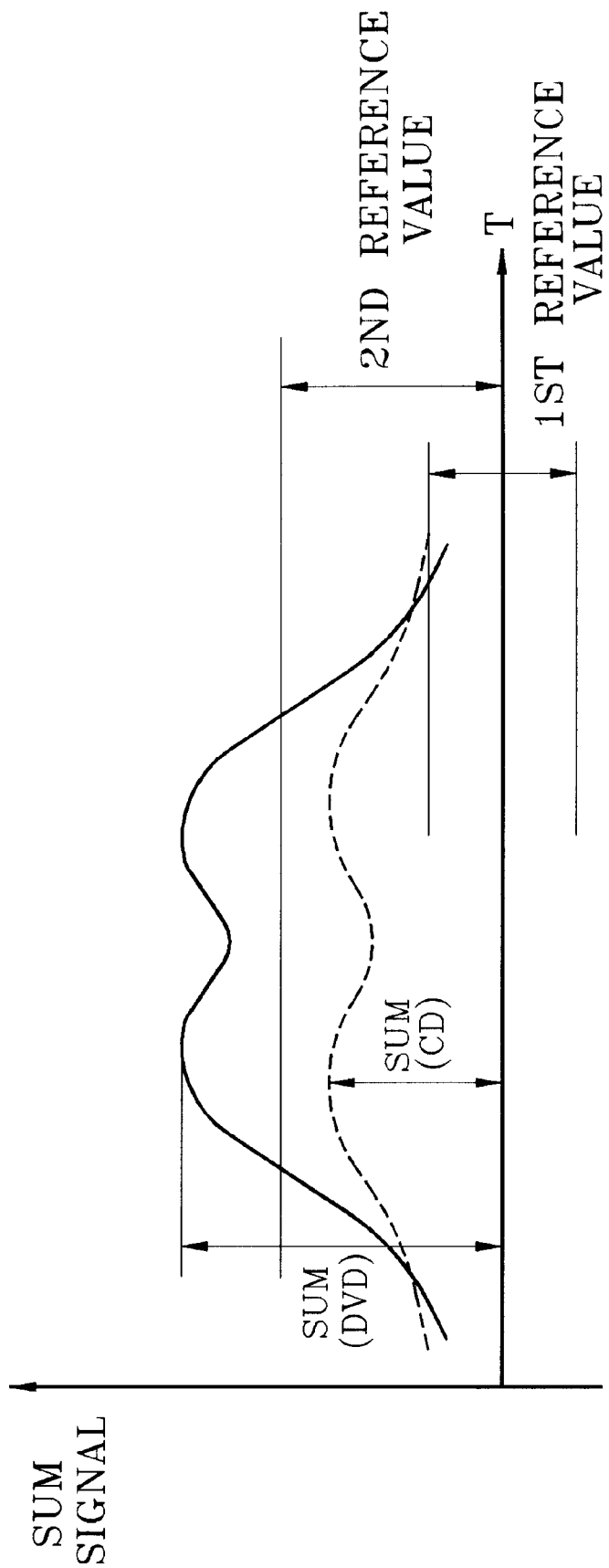
FIGS. 5A and 5B are views illustrating comparison conditions for comparing a sum signal and a focus error signal obtained from the amount of light detected from the divided-by-eight photodiode with predetermined reference values in FIG. 4.
Figure 5B:
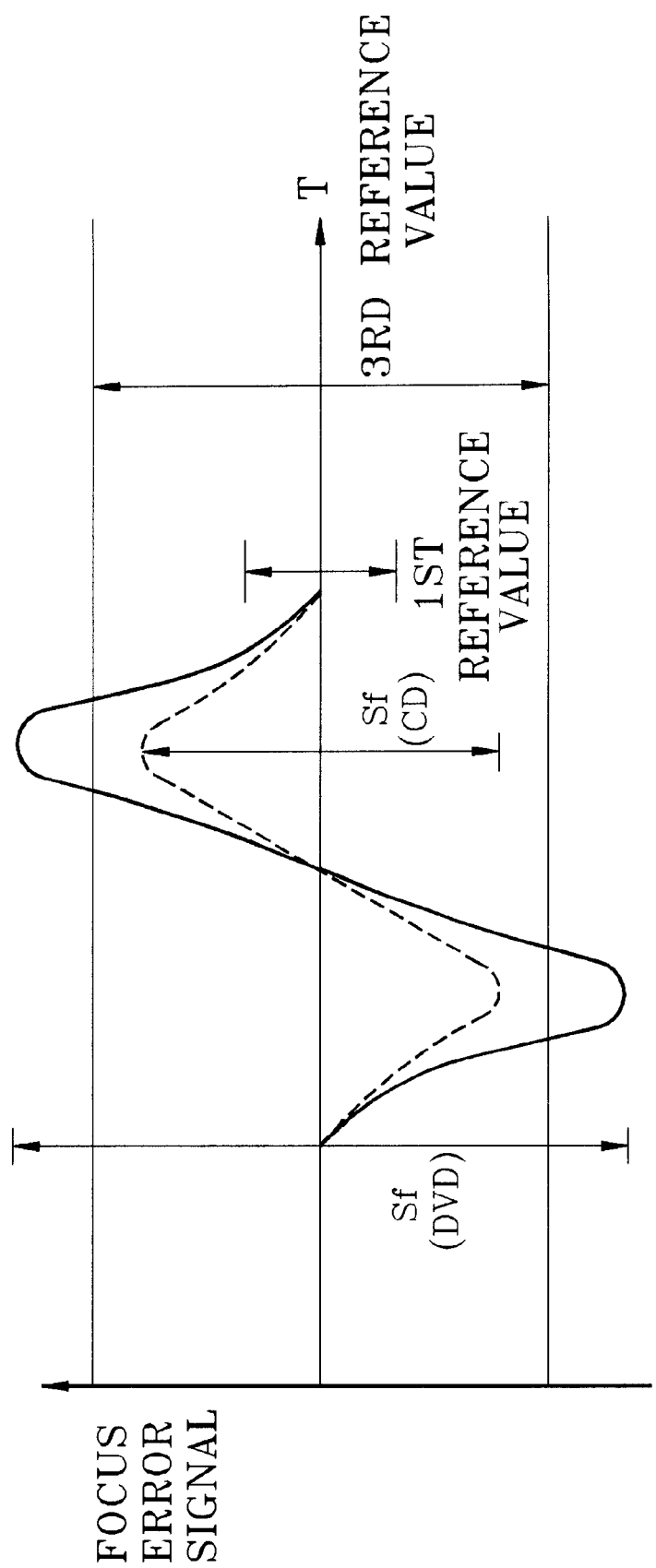

A divided-by-eight photodiode shown in FIG. 3A has optical detection areas $I_1$–$I_4$ which are divided by four inwards and optical detection areas $O_1$–$O_4$ which are divided by four outwards. The photodiode receives light reflected from a disk. A sum signal $[(O_1+O_2+O_3+O_4)+(I_1+I_2+I_3+I_4)]$ and a focus error signal being a difference signal $[(O_1+O_3+I_1+I_3)-(O_2+O_4+I_2+I_4)]$ using the amount of light received in the divided optical detection areas of the photodiode are applied via comparing portion 32 of FIG. 3B. A first comparator 321 in the comparing portion 32 compares the sum signal with a first reference value and outputs a high-level binary signal to a controller 34 when the sum signal is larger than the first reference signal. A second comparator 322 compares the focus error signal with the first reference value and outputs a high-level binary signal to the controller 34 when the focus error signal is larger than the first reference signal. Here, the first reference value is for judging whether the offsets of the sum signal and the focus error signal are within a normal range. As shown in FIGS. 5A and 5B, the first reference value is preset as a value which is slightly smaller than the offsets of both the sum signal and the focus error signal obtained via a CD having a smaller amount of light between DVD and CD. In this case, the first reference value is set considering the amount of signals attenuated from a disk due to fingerprint or damage. A third comparator 323 compares the sum signal with a second reference signal and outputs a binary signal representing the comparison result to the controller 34. A fourth comparator 324 compares the focus error signal with a third reference signal and outputs a binary signal representing the comparison result to the controller 34. The second reference signal is a boundary value for discriminating a disk type with respect to the sum signal SUM, and is preset as a slightly smaller value than an intermediate value of the sum signals obtained from the DVD and CD as shown in FIG. 5A. The third reference signal is a boundary value for discriminating a disk type with respect to the focus error signal Sf, and is preset as a slightly smaller value than an intermediate value of the focus error signals obtained from the DVD and CD as shown in FIG. 5B. The controller 34 supplies the reference signals to the comparators 321–324 in the comparing portion 32, respectively and performs a DVD/CD discrimination operation based on the binary signals output from the comparators 321–324.

Referring to FIG. 4A, if an optical disk such as a DVD or CD is loaded (step 411), the DVD system rotates the optical disk at a constant speed (step 412), and then turns on a laser diode (LD) (step 413). In the case when the present invention fails to discriminate the disk type during a first trial, such discrimination is retried by a predetermined number of times. Thus, the DVD system initializes a value of M representing the number of discrimination before discriminating the disk type, to "1" (step 414). Then, an optical pickup moves repetitively up and down (step 415).

During the time when step 415 is performed, the sum signal and the focus error signal obtained from the amount of light detected from the optical detection areas divided in the divided-by-eight photodiode are compared with the reference signals by the comparators 321–324 in the comparing portion 32, respectively. Using the comparison results, the disk type discrimination operation is performed in the controller 34.

The controller 34 judges whether the binary signals output from the first and second comparators 321 and 322 are high-level values, that is, both the sum signal and focus error signal are larger than the first reference signal, respectively (step 416). When both the binary signals are high-level values in step 416 (FIG. 4B), it is represented that the offsets of both the sum signal and the focus error signal are normal. If the offsets of the signals are judged normal, the controller 34 judges whether both the binary signals output from the third and fourth comparators 323 and 324 are high-level values (step 417). When both the binary signals are high-level values in step 417, it is represented that the sum signal SUM and the focus error signal Sf are larger than the second and third reference signals, respectively. In this case, both signals meet the condition of the DVD. Here, controller 34 judges that the loaded disk is a DVD.

If both the binary signals are not high-level values in step 417, it is judged whether both the binary signals are low-level values (step 418). When both the binary signals are low-level values in step 418, it is represented that the sum signal SUM and the focus error signal Sf meet the condition of the CD. Here, the controller 34 judges that the loaded disk is a CD.

Meanwhile, if both the sum signal SUM and the focus error signal Sf are not low-level values in step 418, that is, if the level values of both the binary signals differ from each other, disk type discrimination is incorrect with respect to the sum signal SUM and the focus error signal Sf, which means that such disk discrimination fails. In the case when the disk type discrimination fails, the present invention causes the optical pickup to move the position of detection of a signal from a disk, to thereby retry discrimination. Here, it is preferable that retrying discrimination is limited to a predetermined number of times. In an embodiment of the present invention, an example of allowing the retrying number of times up to three times will be described below.

In the case when discrimination fails during the time when the operation is performed up to step 418, it is judged whether a value of M is three (step 419). If the M value is not three in step 419, the M value is increased by "1" (step 420). Then, a slide motor operates to enable an optical pickup to move by a predetermined distance in a tracking direction (step 421). Then, the disk type is again discriminated by repeating the operation from step 415.

Meanwhile, if at least one of the sum signal SUM and the focus error signal Sf is smaller than the first reference signal in step 416, which represents that the offset of the signal is varied, the varied offset of the signal is adjusted (step 422), and the operation is performed from step 419.

If the disk type is discriminated, the controller 34 changes over various switches of a system 36 according to the discriminated disk type and controls to set parameters.

If the M value becomes three in step 419 during the time when the above-described steps repeat, it is judged that it is impossible to discriminate the type of the loaded disk any more and an error message is output so that a user can recognize it.

The above-described embodiment uses the sum signal and the focus error signal obtained from the amount of light detected from the four optical detection areas which are located inwards and outwards in the divided-by-eight photodiode. However, it is possible to use the sum signal and the focus error signal obtained from the amount of light detected from one of the inner and outer four optical detection areas, as well as to use a divided-by-four photodiode, which is apparent to a person skilled in the art.

Although the described embodiment uses the size of the signals to discriminate the disk type, it is possible to use a phase difference of the signals and the size ratio between a sum signal and a difference signal. As described above, the disk discrimination method of the DVD system according to the present invention increases reliability of the discrimination result.

While only certain embodiments of the invention have been specifically described herein, it will apparent that numerous modifications may be made thereto without departing from the spirit and scope of the invention.

What is claimed is:

1. A disk discrimination method for a digital versatile disk (DVD) system to discriminate a disk loaded in the DVD system, the disk discrimination method comprising the steps of:
   (a) detecting light reflected from the loaded disk via a DVD/CD combination optical pickup, using an optical detector having a plurality of optical detection areas;
   (b) obtaining a sum signal and a focus error signal from a plurality of signals detected via the plurality of optical detection areas of said optical detector in step (a);
   (c) comparing a magnitude of the sum signal obtained in step (b) with a predetermined first reference value and a magnitude of the focus error signal obtained in step (b) with a predetermined second reference value, respectively, and outputting a comparison result; and (d) judging whether the loaded disk is a DVD or a CD based on the comparison result obtained in step (c).

2. The disk discrimination method for a digital versatile disk (DVD) system according to claim 1, wherein in said step (d) it is determined that the loaded disk is a DVD if the magnitude of the sum signal is larger than the first reference value and the magnitude of the focus error signal is larger than the second reference value, and that the loaded disk is a CD if the magnitude of the sum signal is smaller than the first reference value and the magnitude of the focus error signal is smaller than the second reference value.

3. The disk discrimination method for a digital versatile disk (DVD) system according to claim 1, wherein said step (c) further comprises the sub-step of (c1) comparing the magnitudes of the sum signal and the focus error signal with a third reference value relating to an offset in order to check whether the sum signal and the focus error signal are effective signals prior to comparing the sum signal and the focus error signal with the first reference and the second reference value, respectively.

4. The disk discrimination method for a digital versatile disk (DVD) system according to claim 3, wherein said step (c) further comprises the sub-step of (c2) adjusting the offset of the signal when at least one of the magnitude of the sum signal and the focus error signal is smaller than the third reference value in sub-step (c1).

5. The disk discrimination method for a digital versatile disk (DVD) system according to claim 4, wherein when disk discrimination fails using the sum signal and the focus error signal relating to a particular recording position on the loaded disk in said step (d), and said sub-step (c2) is performed, said steps (a) through (d) are repeated using the sum signal and the focus error signal obtained from a recording position moved by a predetermined distance from said particular recording position.

6. The disk discrimination method for a digital versatile disk (DVD) system according to claim 5, wherein said steps (a) through (d) are repeated a predetermined number of times.

7. The disk discrimination method for a digital versatile disk (DVD) system according to claim 1, wherein said DVD/CD combination optical pickup adopts a shielding film.

8. The disk discrimination method for a digital versatile disk (DVD) system according to claim 1, wherein the number of the optical detection areas of said optical detector is four.

9. The disk discrimination method for a digital versatile disk (DVD) system according to claim 1, wherein the number of the optical detection areas of said optical detector is four inwards and outwards, respectively.

10. The disk discrimination method for a digital versatile disk (DVD) system according to claim 9, wherein said sum signal is one of a sum of signals from the inner optical detection areas, a sum of signals from the outer optical detection areas, and a sum of the sum signals from both the inner and outer optical detection areas.

11. The disk discrimination method for a digital versatile disk (DVD) system according to claim 9, wherein said focus error signal is one of the focus error signal from the inner optical detection areas, the focus error signal from the outer optical detection areas, and the focus error signals from both the inner and outer optical detection areas.

* * * * *